PATENTED JULY 31, 1826.
4504X
J. WEBSTER.
MILL FOR GRINDING CORNCOBS, PLASTER OF PARIS, WOOD, &c.
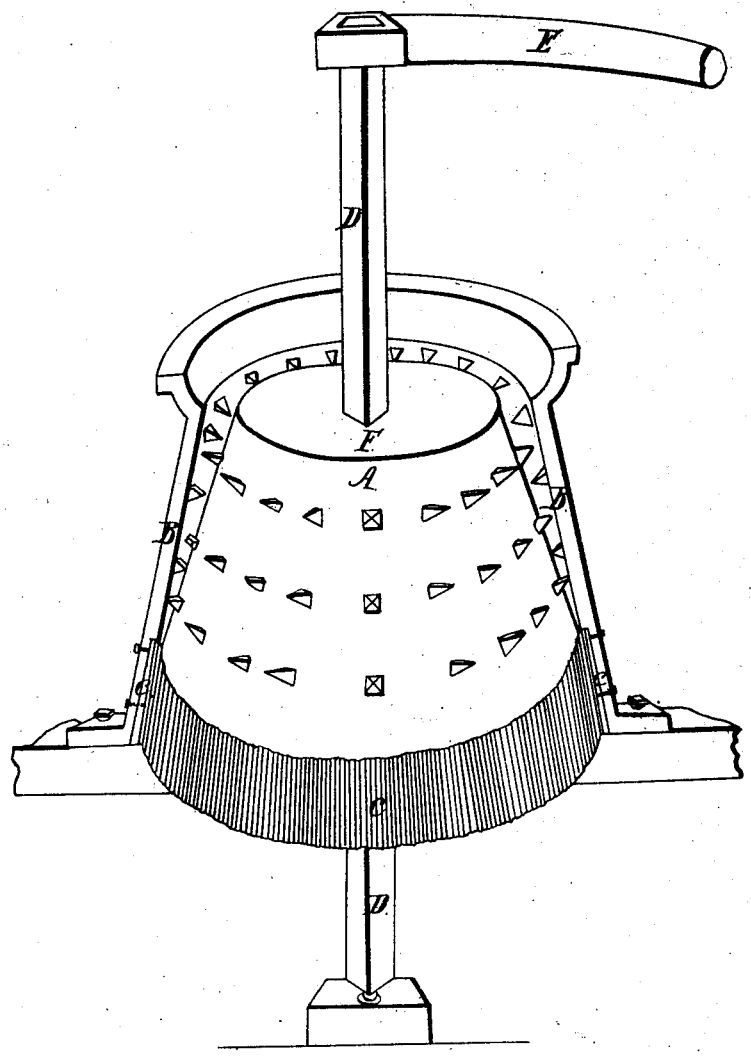
THE NORRIS PETERS CO., PHOTO-LITHO., WASHINGTON, D.C.

MISSING PAGE TEMPORARY NOTICE

PATENT # 4504X FOR ISSUE DATE 7-31-1826

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # All Text